No. 654,816. Patented July 31, 1900.
I. E. STOREY.
ELECTRICAL TRANSMISSION OF POWER.
(Application filed Nov. 18, 1899.)
(No Model.)
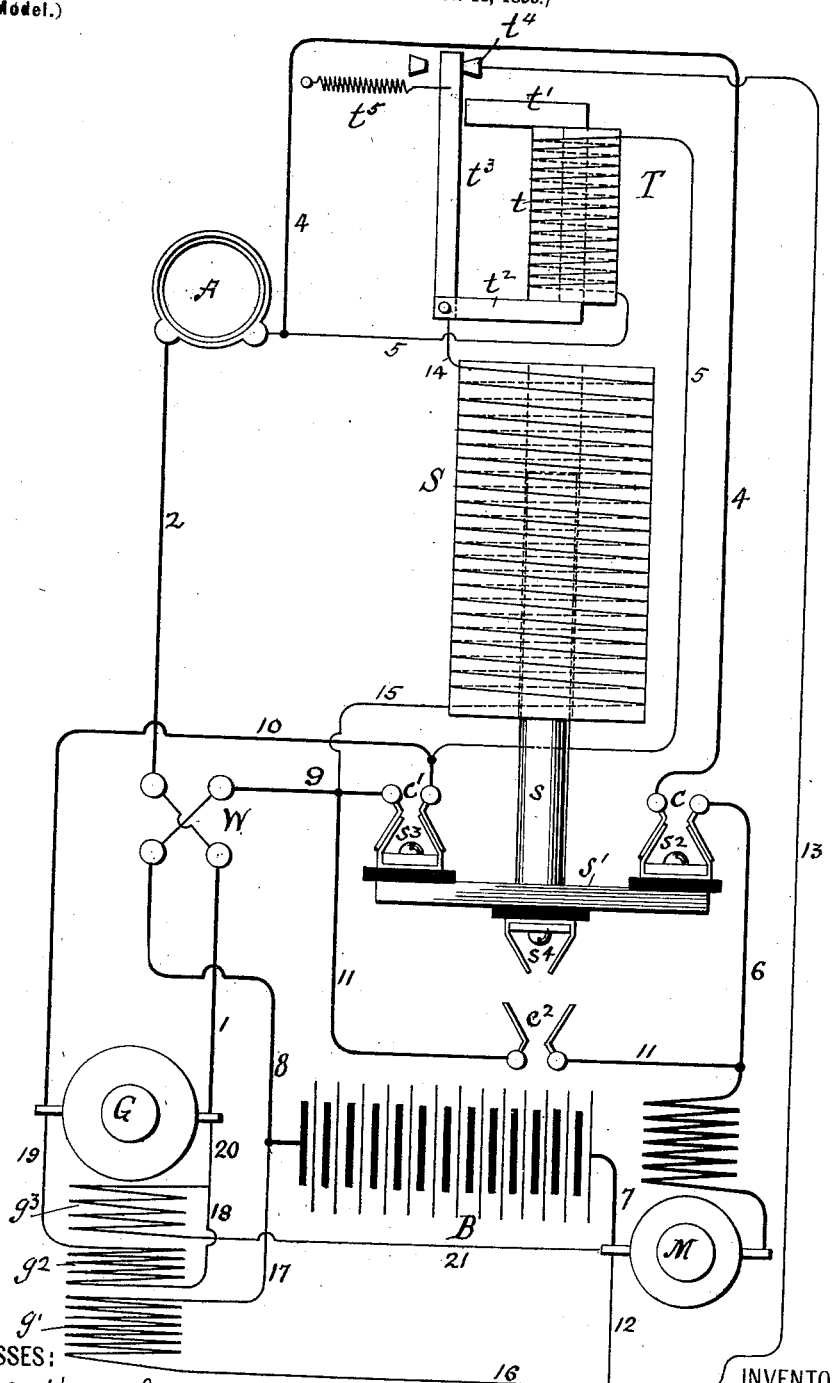
WITNESSES:
Geo. S. Kennedy.
Frank S. Ober.
INVENTOR
Imre E. Storey
BY
M. Rosenbaum
ATTORNEY
THE NORRIS PETERS CO., PHOTO-LITHO., WASHINGTON, D. C.

United States Patent Office.

IMLE E. STOREY, OF TRENTON, NEW JERSEY.

ELECTRICAL TRANSMISSION OF POWER.

SPECIFICATION forming part of Letters Patent No. 654,816, dated July 31, 1900.

Application filed November 18, 1899. Serial No. 737,436. (No model.)

*To all whom it may concern:*

Be it known that I, IMLE E. STOREY, a citizen of the United States, residing at Trenton, in the county of Mercer and State of New Jersey, have invented certain new and useful Improvements in Electrical Transmission of Power, of which the following is a full, clear, and exact description.

This invention is a system of power conversion and transmission involving an electric generator driven at variable speed, a storage battery, and a motor or other power-consuming device. As an example of such a system I may point to a refrigerating apparatus upon a car or train of cars wherein the compressor of the refrigerating machinery is driven by an electric motor, which from the very nature of its work must run regardless of whether the train be moving or still or moving at variable speeds, a dynamo-electric machine which normally supplies the motor, but which is driven from the axle of the vehicle, and consequently at a variable speed, and a storage battery which is charged from the dynamo and which furnishes current to the motor when the dynamo is not generating. My invention is specially applicable to this kind of system and will be described in connection therewith, although it is to be understood that the invention and its use are not limited to the operation of a refrigerating plant or to the application to a train of cars, but, on the contrary, may be used and applied wherever a variable-speed generator is necessitated and a battery and motor or other translating devices are operated therefrom. In such a system it is necessary to provide a form of regulation for the generator which will maintain its output at a given value between certain minimum and maximum speeds widely different, and it is desirable to provide for automatically changing the circuits, so that when the speed of the generator lowers to a point below the service minimum its circuit will be opened and the storage battery connected to supply the motor. Hence this regulation and switching mechanism are the objects of my invention, and this will all be fully described hereinafter with reference to the accompanying drawing, and pointed out in the claims.

The drawing is a diagrammatical representation of the apparatus and circuits comprehended by my invention.

G indicates a dynamo-electric machine adapted to be driven from the axle of the railway-train or from any other variable-speed source. Its field-magnet is provided with three coils or sets of coils $g'$ $g^2$ $g^3$, respectively.

$g'$ and $g^2$ are exciting-coils connected, as will hereinafter be described, while $g^3$ is an opposing coil of many turns having the tendency to weaken the field produced by coils $g'$ and $g^2$.

M is an electric motor having an ordinary series-connected field.

B is a storage battery having a voltage sufficient to operate the motor to full speed at maximum load.

S is a solenoid whose core $s$ carries a cross-bar $s'$, upon each end of which is a metallic insulated clip $s^2$ $s^3$, respectively adapted to engage and bridge, respectively, two pairs of contacts $c$ $c'$ when the core is in its elevated position. The cross-bar also carries a third metallic insulated clip $s^4$, which when the core is in its lower position engages and bridges a pair of contacts $c^2$. When the solenoid is energized, its core is elevated and the circuits between the contacts $c$ and contacts $c'$ are closed. When the solenoid is deënergized, gravity or a spring will move the core and break the circuit at $c$ $c'$ and make it at $c^2$.

T is an automatic switch consisting of a coil $t$, surrounding a core carrying two pole-pieces $t'$ $t^2$. An armature $t^3$ is pivoted to one pole-piece and is adapted to make contact when the magnet is energized with a point $t^4$ and to break contact therewith under the action of a spring or other suitable device $t^5$ when the magnet is deënergized.

A is an ammeter showing the current on the dynamo-circuit.

W is a main switch for putting the system into and out of operative condition.

The circuits are as follows: From the dynamo a wire 1 leads to the main switch, thence by wire 2 to the ammeter, thence to the point 3, where the circuit branches, one part, 4, leading to one of the contacts $c$ and the other part, 5, leading through coil $t$ to wire 10 and the dynamo. From the other contact $c$ wire 6 leads to the field of the motor, thence through the motor-armature, then by wire 7 to the battery, wire 8 to the main switch, wire 9 to one of the contacts $c'$, and from the other contact $c'$ by wire 10 to the dynamo. A branch circuit 11 leads from wire 9 through the contact $c^2$ to wire 6. Another circuit leads from wire 7 by wire 12, wire 13, to the contact $t^4$, through the armature $t^3$, wire 14, through the solenoid S and wire 15 to wire 9. Field-coil $g'$ is in a shunt 16 17, directly across the terminals of the battery. Field-coil $g^2$ is in a shunt 18 19, directly across the brushes of the dynamo. The opposing coil $g^3$ is in a shunt to the brushes of the dynamo, which also includes the battery, and is traced by wire 20 through the coil, wire 21 through the battery, wire 8, main switch W, wire 9, contacts $c'$, and wire 10 to the generator.

The operation is as follows: When the train or other source of power connected to drive the generator starts up, the solenoid-core is down and the armature $t^3$ is against its backstop, the circuit through the solenoid thus being open. Assuming the main switch W to be closed, the dynamo will commence to generate and send a current over wires 1 2, the ammeter, wire 5, and wire 10, wire 5 including the coil $t$. Coil $t$ is of such resistance that the voltage of the dynamo must rise until it is slightly greater than that of the battery before magnet T will overcome the spring $t^5$ and draw its armature against the point $t^4$. When this takes place, the circuit of the solenoid is closed through the battery over the following course: from contact $t^4$ by wire 13 12 7, battery 8 9 15, solenoid 14, and armature $t^3$. The solenoid thus energized will lift its core until its contacts $s^2$ and $s^3$ bridge the contacts $c$ and $c'$, respectively. This will close a circuit for the dynamo through the battery and motor in series as follows: by wire 1 2, ammeter 3 4, contacts $c$ 6, motor 7, battery 8 9, contacts $c'$ and 10, to dynamo. Now since the voltage of the generator is above that of the battery the battery will be charged and the motor will be driven up to its maximum speed at full load. At the same time the opposing coil $g^3$ on the field-magnet of the dynamo will get little, if any, current, because of its high resistance. If the speed of the generator should increase, as will ordinarily be the case on a train, the voltage will rise, and since the coil $g^3$ of the dynamo is in a shunt which includes the battery a certain amount of current will flow through it and produce a magnetic effect upon the field of the generator in opposition to that of its regular exciting-coils $g'$ $g^2$ and will consequently decrease the voltage of the generator. Further increases of speed and rises of voltage would result in corresponding increases of amperes through the opposing coil, which on account of its many turns would rapidly nullify the dynamo-field on account of the rapidly-increasing number of ampere-turns thus produced, so that regardless of the increase of speed of the generator its electromotive force would never rise far beyond that which is necessary to drive the motor and charge the battery in series. The function of coils $g'$ $g^2$ is merely to supply the normal excitation of the field-magnet. Coil $g'$ being directly off the terminals of the battery insures a field in starting up, while coil $g^2$ is a regular shunt field-coil. When the speed of the generator decreases and reaches a point below where it will charge the battery, the coil $t$ becomes too weak to hold the armature $t^3$ and the circuits of the solenoid are broken. This allows the solenoid-core to fall, thus breaking the dynamo-circuit at the two points $c$ and $c'$ and closing the branch circuit 11 at $c^2$. This puts the motor and battery into series on an independent closed circuit as follows: from battery by wire 7, motor M, wire 11 9, switch W, and wire 8 back to battery. The motor will continue in operation without a diminution of speed under the current supplied by the battery. This will continue until the dynamo again generates its normal voltage, whereupon the battery and motor will be thrown into series with the generator and the operation take place as before.

Having described my invention, I claim—

1. The combination of a variable-speed dynamo-electric machine, a storage battery and an electric motor in series therewith, an exciting-coil on the field-magnet of the dynamo, an opposing coil for weakening the field-magnet excitation of the dynamo, and means whereby the voltage generated by the dynamo in excess of that required to charge the battery and drive the motor will cause current to flow through said opposing coil, for the purpose set forth.

2. The combination of a variable-speed generator, a storage battery and a translating device in series therewith, said generator having an exciting-coil and a coil opposing the exciting-coil on its field-magnet, said opposing coil being in a shunt-circuit from the armature of the generator which shunt-circuit also includes the battery, substantially as described.

3. The combination of a variable-speed generator, a storage battery and an electric motor in series therewith, said generator having an exciting-coil and a coil opposing the exciting-coil on its field-magnet, said opposing coil being in a shunt-circuit from the armature of the generator which shunt-circuit also includes the battery, substantially as described.

4. The combination of a variable-speed generator, a storage battery and an electric motor in series therewith, said generator having an exciting-coil and a coil opposing the exciting-coil, on its field-magnet, said opposing coil having one terminal connected with a brush of the generator and the other connected to the generator-circuit at a point between the battery and the motor, substantially as described.

5. The combination of a variable-speed dynamo-electric machine, a storage battery and an electric motor in series therewith, an automatic switch acting to maintain the dynamo-battery and motor in a closed circuit as long as the electromotive force of the dynamo is sufficient to charge the battery and drive the motor, and to open the circuit of the dynamo and close another circuit through the battery and motor when the electromotive force of the dynamo is not sufficient to charge the battery and drive the motor, and an opposing coil on the field-magnet of the dynamo tending to prevent an increase of the electromotive force of the dynamo beyond that required to charge the battery and drive the motor, substantially as described.

In witness whereof I subscribe my signature in presence of two witnesses.

IMLE E. STOREY.

Witnesses:
C. H. WICKHAM,
RUPERT A. JENKS.